Nov. 8, 1960 B. C. VON PLATEN ET AL 2,959,392

FLUID-TIGHT VALVE SEAT

Filed Nov. 8, 1957 4 Sheets-Sheet 1

INVENTOR.

Baltzar Carl von Platen

BY Eric Y. Munson

Attorney

INVENTOR.
Baltzar Carl von Platen
BY
Eric Y Munson
Attorney

Nov. 8, 1960 B. C. VON PLATEN ET AL 2,959,392

FLUID-TIGHT VALVE SEAT

Filed Nov. 8, 1957 4 Sheets-Sheet 3

INVENTOR.
Baltzar Carl von Platen.
BY
Eric Y. Munson
attorney

FLUID-TIGHT VALVE SEAT

Filed Nov. 8, 1957 4 Sheets-Sheet 4

INVENTOR.
Baltzar Carl von Platen
BY
Eric G Munson
Attorney

United States Patent Office 2,959,392

Patented Nov. 8, 1960

1

2,959,392

FLUID-TIGHT VALVE SEAT

Baltzar Carl von Platen and Finn Lennart Jonsson, both of Gotgatan 16, Stockholm, Sweden Filed Nov. 8, 1957, Ser. No. 695,312

5 Claims. (Cl. 251—332)

This invention relates to faucets or taps and has particular reference to the valve and seat and by which the opening and closing of the tap is effected.

It is an object of the invention to provide a faucet or tap of greatly increased operating life due to the fact that the packing, constituting part of the seating means of the valve, will be exceptionally long-lived, even under repeated closing pressure of more than normal force. It is an object of the invention to provide a water tap or cock which will not drip even after extraordinary use, regardless of whether the tap is closed with normal or extra pressure or with the relatively small amount of force as applied by a child when closing the tap.

With these, and other objects to be hereinafter set forth in view, I have devised the arrangement of parts to be described and more particularly pointed out in the claims appended hereto.

In the accompanying drawings, wherein several embodiments of the invention are disclosed, Fig. 1 is a cross sectional view of a tap or cock constructed according to the invention;

Figures 1, 2, 3:
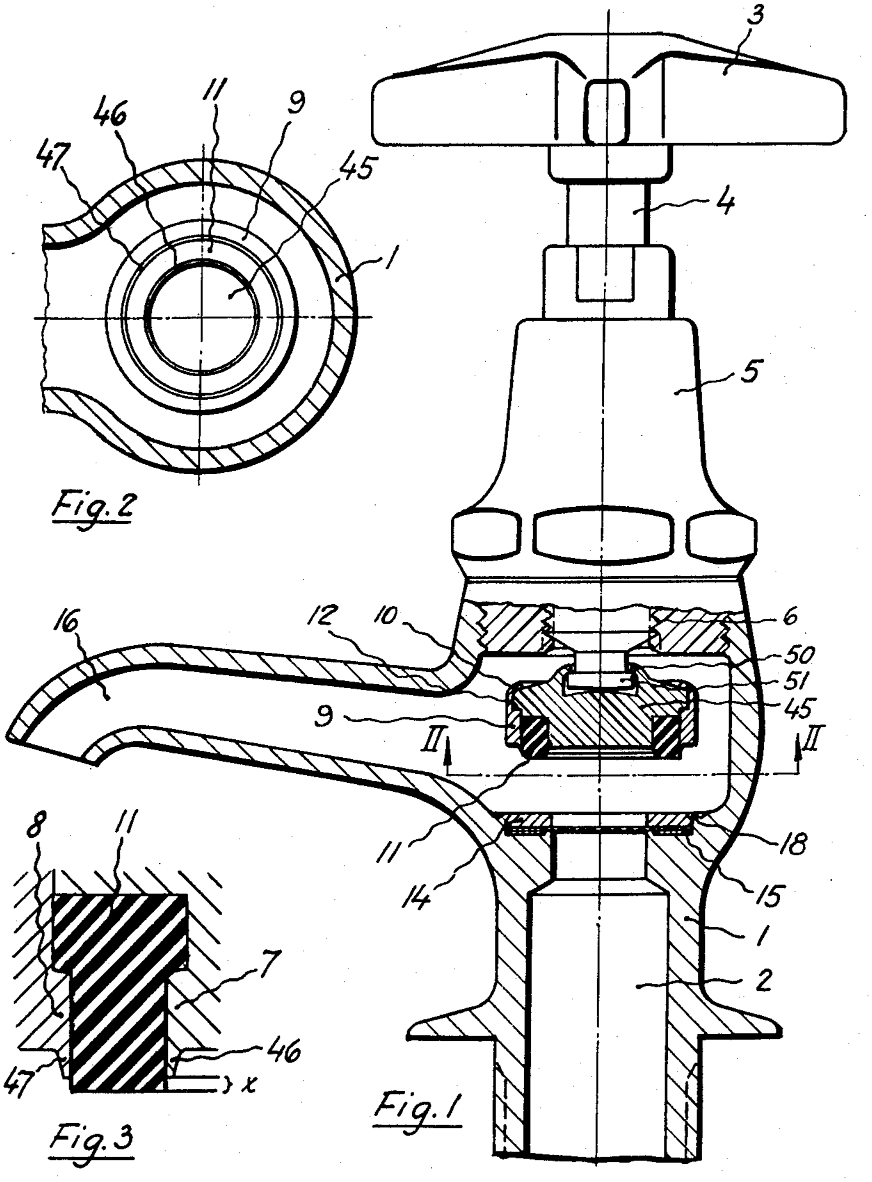
Fig. 2 is a sectional view, taken substantially on the line II—II of Fig. 1, looking in the direction of the arrows.
Fig. 3 is an enlarged sectional view of the rubber ring and its mounting in the valve head of Fig. 1.

Referring to the drawings, and more particularly to the embodiment of the invention shown in Figs. 1 to 3 inclusive; 1 indicates the shell or body of the faucet or tap, which may be of conventional form and includes the water passage 2, the outlet spout 16, the hand wheel 3 and spindle 4 attached thereto, and which is vertically movable by means of the hand wheel 3. The spindle 4 carries the threaded element 5 by means of which the valve head is moved toward or away from the seat by

2 manipulation of the hand wheel. The valve head is shown at 45 and is provided with a central recess bordered by a flange 50, and the lower end of the spindle 4 carries a disk 51 contained in the recess and retained therein by the flange 50. This arrangement is such that the valve head 45 is attached to the end of the spindle 4 in a manner to permit rotative movement of the valve head relatively to the spindle.

At 11 is shown a rubber ring which is contained in a channel defined by a pair of opposed flanges 7 and 8. The flange 7 is an integral part of the body of the valve head and the flange 8 is a part of a circumferential ring or annulus 9 which is fitted around the valve head after the rubber ring 11 has been put in position thereon. It will be noted that the rubber ring 11 has a thicker upper portion and that the channel in which the rubber ring is located is defined by the opposed flanges 7 and 8 and is shaped so as to be undercut and conform to the shape of the ring. The ring 9 is also provided at the top with an inturned flange which closely conforms to the upper surface of the valve head, and is also provided with a shoulder 12 fitting against a similar shoulder formed on the peripheral edge of the valve head. This arrangement is such that the ring 9 is securely maintained in position on the valve head. At the lower termination of the flange 8 is formed a thin ridge 47 and on the lower termination of the flange 7 is formed a thin ridge 46. This is more clearly shown in Fig. 3. The ends of the ridges 46 and 47 are in the same plane and the cross-sectional shape of these ridges is preferably triangular so that each ridge terminates in a relatively sharp edge. For example, the base of the triangle can be 0.3 mm. and its height 0.5 mm.

While the ring 11 is stated to be of "rubber" it is probably preferable that the same shall be of neoprene or of a material of similar characteristics. The ridges disclosed at 46 and 47 might be of rectangular cross section, but it is preferable to make the same triangulated as heretofore explained.

From the construction described it will be noted that the ring 11 is confined in an annular groove which has a depth slightly less than the height of the rubber ring. The difference in height, and hence the projection of the rubber ring out of its groove is indicated at $x$ in Fig. 3. If the parts 9 and 45 are made of brass, the surfaces contacting the rubber ring should be tin-plated or covered with other suitable protective material.

In this embodiment of the invention, the valve seat consists of flat-faced ring or annulus 14 of a relatively hard and non-corrosive material, such as stainless steel. Beneath the ring 14 is located a packing 15, and the portion of the housing or shell around the peripheral edge of the ring 14 is inturned, as indicated at 18 to thereby confine the ring 14 in its recess and retain it pressed against the packing.

It is important that the projection of the rubber ring 11 out of its groove shall be maintained to a certain limit. However, should the projection of the rubber ring exceed the desired limit a trimming effect is secured and the valve will function as desired. If the rubber or other sealing material should project beyond the ridges 46 and 47 to such an extent that it could not be compressed into the groove under the high pressure employed, then, the portion of rubber that could not be forced into the groove would squirt out between the ridges 46 and 47 and the opposing member. This portion of rubber or other sealing material would prevent the valve from closing properly and cause leakage and vibrations. In order to prevent such improper sealing, the ridges 46 and 47 are provided with shearing edges, which sever the rubber or other material squirting out between the opposing members as the ridges are finally forced into contact with the opposing member.

Another function performed by the described structure consists in confining the ring in a manner to enable it to be compressed to a definite degree, and further compression of the ring is prevented by the contact of the flanges 46 and 47 with the seating ring 14. Thus, extraordinary distortion, and hence deterioration, of the rubber ring is materially retarded.

Each time that the tap is closed, the rotative movement of the valve head 45 is braked. The head 45 rotates with the spindle 4 in the valve open position as the water presses it against the disk 51 until the valve head closes against the seat member 14. When the tap is new, the rotation of the valve head is braked by friction between the ring 14 and the rubber ring 11. As the rubber ring 11 wears down, due to repeated use of the tap, contact begins to take place between the ridges 46 and 47 and the upper face of the ring 14 and this occurs while the valve head 45 is in rotation. Thus, at this time the ridges 46 and 47 participate in the braking action applied to the valve head. As a result these ridges start to wear down. The top pressure on the rubber ring has now lowered and as the pressure on the rubber ring becomes less, the more quickly will the ridges 46 and 47 wear down. The ridges must thus be of a material not too resistant to wear and they should be made as thin as possible without materially detracting from their mechanical durability. Since the ridges 46 and 47 are, by reasons of durability, made thicker at their bases than at their edges, the highest possible pressure in the rubber ring will be lower when the tap is old and has had long use, and the ridges will be low and wide.

Figure 4:
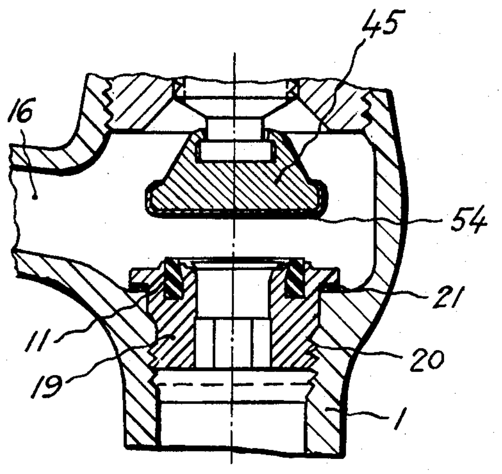
Fig. 4 is a sectional view of a portion of the tap or cock, showing the rubber ring fitted in the valve seat as distinguished from its mounting in the valve head, as in Figs. 1 and 3.
Figure 5:
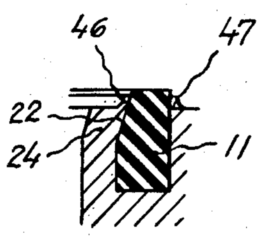
Fig. 5 is a vertical sectional view through the rubber ring of Fig. 4 and the portion of the seat in which the ring is mounted.
Figure 7:
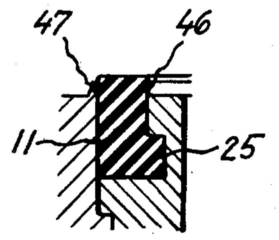
Fig. 7 is a sectional view of the rubber ring and its mounting, as shown in the embodiment of Fig. 6.

In the embodiment of the invention shown in Fig. 4, the rubber ring 11 is shown as located in the seating rather than in the valve head as in Fig. 1. In Fig. 4, the ring 11 is fitted in a cylindrical seat 19 provided with a thread 20 received in the water inlet passage of the shell or housing 1. A packing ring 21 is positioned under the flanged upper end of the seat 19. The inner surface of the rubber ring 11 is tapered toward the top edge of the ring, as shown at 22. When the rubber ring 11 is placed in its groove in the top of the seat 19, the flange 24 is out-turned so that it engages against this inclined or tapered part of the rubber ring and confines the ring in its groove. A sheathing 54 of stainless steel covers the under surface of the valve head 45. The ridges 46 and 47 as described with respect to the embodiment of Fig. 1 are arranged in the seat 19 as clearly shown in Figs. 4 and 5.

Figure 6:
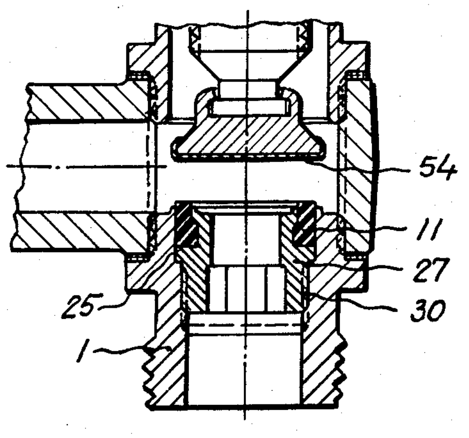
Fig. 6 is a sectional view through a tap in which cold and warm water is mixed.

In the embodiment shown in Fig. 6 the rubber ring 11 is also located in the valve seat. In this construction, the ring is retained in position in the seat by means of its thicker base portion 25 being fitted in an undercut groove in the valve seat 27. The valve seat 27 has a thread 30 which is threaded into the water inlet passage of the shell or housing 1. As disclosed in the embodiment shown in Fig. 4, a stainless steel sheathing 54 covers the flat under surface of the valve head.

Figure 8:
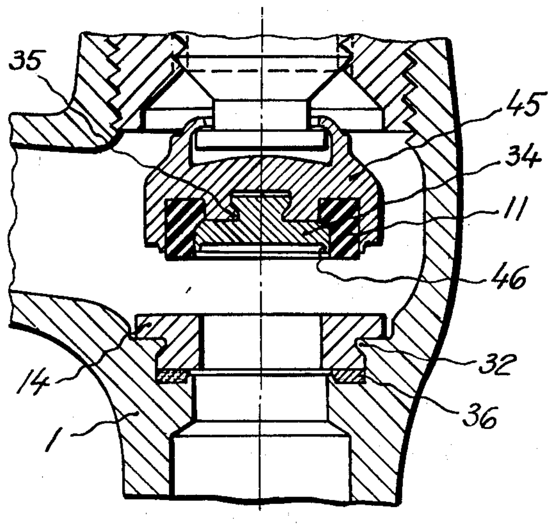
Fig. 8 is a sectional view of another embodiment of the invention.
Figure 9:
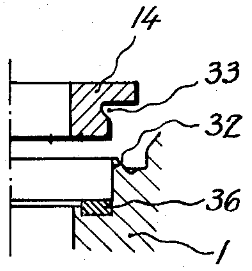
Fig. 9 is a detail view showing how the seating elements are constructed.

In Fig. 8, the steel ring 14 is retained on the shell or housing 1 as a seat. Therein the ring 14 is shown as resting on a packing 36 which may be made of fibre or of another material of similar characteristics. The manner in which the seat 14 is placed in position is more clearly shown in Fig. 9 and it will be noted that when the ring 14 is pressed down on the fibre packing, a flange shown at 32 and formed on the body of the shell 1, will be inwardly deformed and caused to be directed into the annular groove 33 in the edge of the ring 14, thus retaining the ring in place as shown in Fig. 8. The valve head 45 in this embodiment, has a central disk 34 attached to it and which disk is provided with the ridge or lip 46. The disk 34 is attached to the valve head 45 by means of the inturned flange 35 which extends into a groove in the disk 34 and thereby attaches the disk 34 to the valve head 45 in a manner similar to that in which the seating ring 14 is secured to the shell 1. It is to be noted, however, that the disk 34 is attached to the valve head only after the rubber ring 11 has been fitted into position on the valve head.

Figure 10:
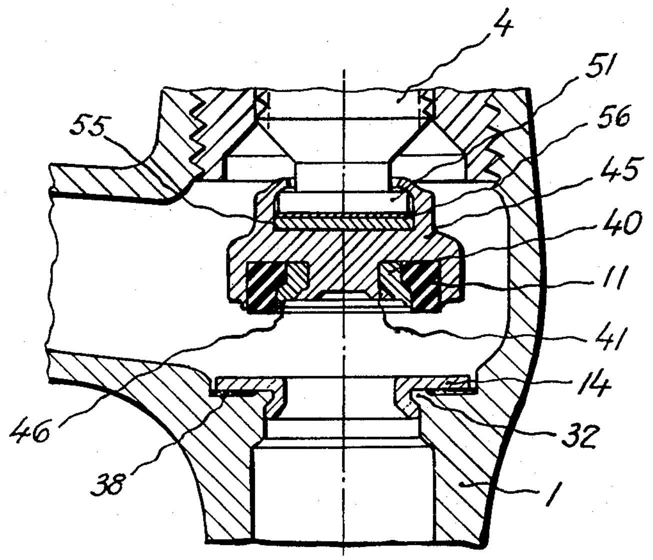
Fig. 10 is a sectional view of another embodiment of the invention.

In the embodiment shown in Fig. 10, the ring 14 is composed of sheet stainless steel and is attached to the shell 1 by having its inner edge out-turned to take under the flanges 32, and this ring rests against the packing shown at 38. The rubber ring 11 is fitted in the valve head 45, and interposed between the rubber ring and the valve head is a metal ring 40 which is retained on the valve head by an out-turned flange 41 formed on the valve head. Between the valve head 45 and the disk 51 is a sheet 55 of rubber and a sheet 56 of stainless steel or other suitable material. Between the sheet 56 and the disk 51 is a very thin layer of graphite or molybdensulphide. The rubber plate allows slight sway of the valve head. When the valve head 45 rotates on the disk 51 or relatively to the spindle 4, the friction will be reduced by the sheet 56 since the friction co-efficient is much less than the friction between metal and rubber. By the graphite or similar material the friction will be even more reduced.

Figure 11:
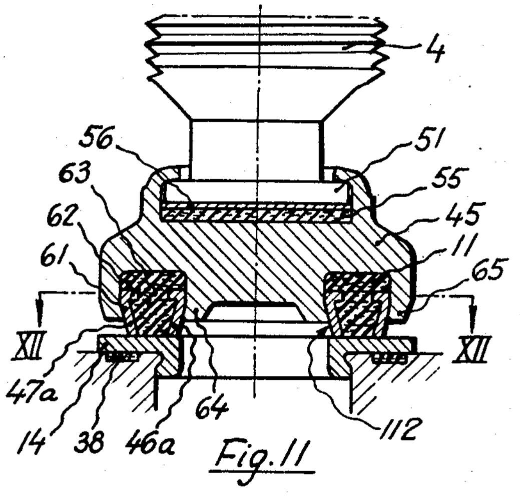
Fig. 11 is still another embodiment of the invention.
Figure 12:
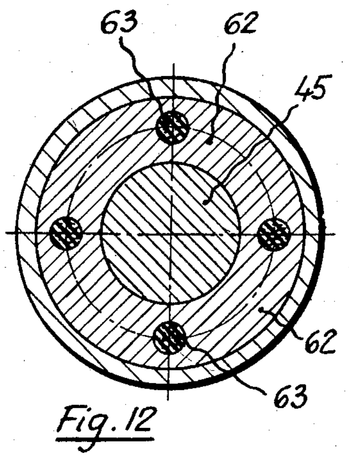
Fig. 12 is a sectional view, taken substantially on the line XII—XII of Fig. 11, looking in the direction of the arrows.
Figure 13:
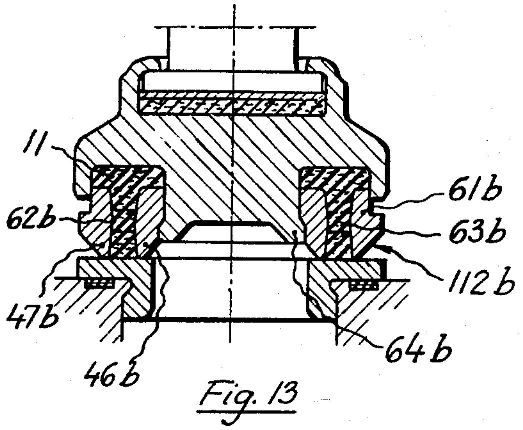
Fig. 13 is a sectional view of a tap constructed slightly different from that shown in Figs. 11 and 12.

In Fig. 11 the rubber packing is shown as being molded within a ring-shaped retainer 61, and a somewhat similar arrangement is also shown in Fig. 13. The flanges **46*a* and 47*a* are arranged convergently. The inner flange 46*a* and the exterior flange 47*a* are integrally united at the top by the upper wall 62. This wall is perforated by a few holes as shown at 63. In the drawing (Fig. 12) four of such holes are shown. Thus, in this embodiment the rubber packing 11 and the channel-shaped ring 61 form a unitary structure designated as 112. This structure is made separately from the tap proper and then fitted in position on the valve head 45. Then the flanges 64 and 65 are out-turned to thereby retain the rubber member 11 and its channel-shaped retaining ring attached to the valve head. If the ring 61 is made of brass or of other quick-wearing material, the end edges of the flanges 46*a* and 47*a* will wear away in the same manner as the ridges 46 and 47 of the previous embodiments of the invention. On the whole, this embodiment functions in the same manner as those previously described. On the other hand, if the ring 61 is made of stainless steel or other wear-resistant material, the effect or action will be different. That is to say, when the valve is closed, a small amount of the rubber will be forced through the holes 63 in the direction of the seat 14. This is necessary partly because the rubber, which gets worn by contact with the seat 14, has to be replaced, and when the valve is turned off, the rubber in the proximity of the seat 14** shall be enabled to get under pressure. The loss of pressure on the rubber will not be too great if the diameter of the holes is of a magnitude of 1 mm. But this is a matter of the length of the holes and the degree of hardness of the rubber.

In Fig. 13 is shown an embodiment which is substantially similar to that shown in Figs. 11 and 12 and as above described. In this embodiment, the parts shown at **46*b*, 47*b*, 61*b*, 62*b*, 63*b* and 112*b*** correspond substantially to the parts similarly numbered with the letter "*a*" affixed, in Figs. 11 and 12.

Having described several embodiments of the invention, it is obvious that alterations may be made without departing from the spirit of the invention. The tap or faucet shown and described can be used for other liquids than water and can also be used for gases. However, its main use is for water and therefore the invention has, for convenience, been herein described with relation to a water tap or cock. It is to be understood, however, that the invention is not to be so limited since it is obvious that the structures described might be used for other liquid or gaseous fluids.

What we claim is:

1. A fluid-tight valve seat arrangement for a valve having a valve member operable to move in opposite directions to open and close the valve against a seat member annularly surrounding a port and having a flat seating surface lying in a plane substantially perpendicular to the direction of movement of said valve member, an annular groove in one of said members having two concentric annular ridges for engaging the opposite one of said members in the closed position of the valve, a packing of resilient, extrudable material disposed in said groove and normally projecting beyond said ridges, said ridges constituting shearing edges adapted to sever the packing material extruded between said members when said ridges engage said opposite member, whereby the packing will be confined within said groove under pressure against said members to seal the port.

2. A valve seat arrangement according to claim 1 in which said annular ridges are tapered in the direction toward the opposite member.

3. A fluid-tight valve seat arrangement for a valve having a valve member operable to move in opposite directions to open and close the valve against a seat member annularly surrounding a port and having a flat seating surface lying in a plane substantially perpendicular to the direction of movement of said valve member, an annular groove in said valve member having annular concentric ridges for engaging said seat member in the closed position of the valve, a packing of resilient, extrudable material disposed in said groove and normally projecting beyond said ridges, said ridges constituting shearing edges adapted to sever the packing material extruded between said valve member and said seat member upon engagement of said ridges with said seat member, whereby the packing will be confined under pressure within said groove to seal the port.

4. A fluid-tight valve seat arrangement for a valve having a valve member operable to move in opposite directions to open and close the valve against a seat member annularly surrounding a port and having a flat seating surface lying in a plane substantially perpendicular to the direction of movement of said valve member, said valve member comprising a head member, a ring-shaped member carried by said head member, at least said head member being recessed to form an annular groove together with said ring-shaped member and facing said seat member, said groove having two concentric annular ridges for engaging said seat member in the closed position of the valve, a packing of resilient, extrudable material disposed in said groove and normally projecting beyond said ridges, said ridges constituting shearing edges adapted to sever the packing material extruded between said valve member and said seat member upon engagement of said ridges with said seat member, whereby the packing will be confined under pressure within said groove to seal the port.

5. A fluid-tight seat arrangement for a valve having a valve member operable in opposite directions to open and close the valve against a valve seat member annularly surrounding a port and having a flat seating surface lying in a plane substantially perpendicular to the direction of movement of said valve member, a disc member centrally carried by said valve member and facing said seat member, said valve member being recessed to form an annular groove jointly with said disc member, said valve member and said disc member having concentric annular ridges for engaging said seat member in the closed position of the valve, a packing of resilient, extrudable material disposed in said groove and normally projecting beyond said ridges, said ridges constituting shearing edges adapted to sever the packing material extruded between said valve member and said seat member upon engagement of said ridges with said seat member, whereby the packing will be confined under pressure within said groove to seal the port.

References Cited in the file of this patent

UNITED STATES PATENTS

| | | |
|---|---|---|
| 878,809 | Larned | Feb. 11, 1908 |
| 997,693 | Osborne | July 11, 1911 |
| 2,194,261 | Allen | Mar. 19, 1940 |
| 2,210,046 | Schubring | Aug. 6, 1940 |
| 2,715,010 | Reeves | Aug. 9, 1955 |